Dec. 5, 1961  SHO TAKAHAMA  3,011,418
MAGAZINE FOR PHOTOGRAPHIC CAMERAS
Filed March 23, 1959
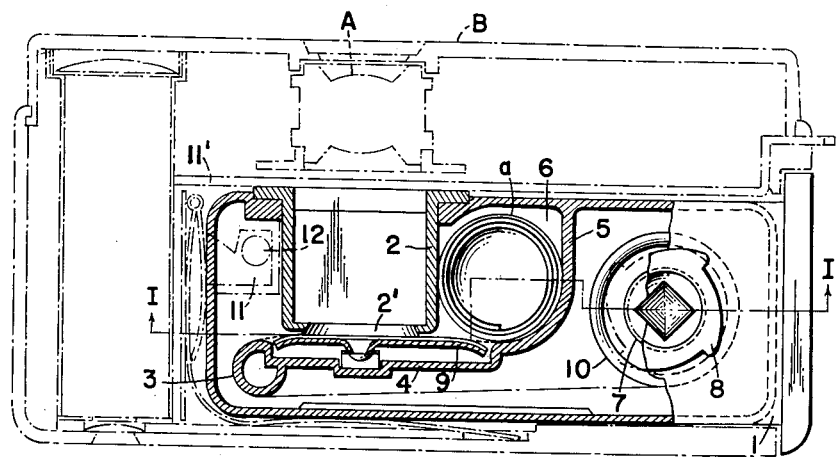
FIG.1
FIG.2
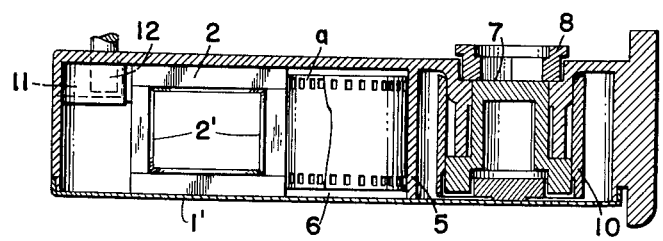
INVENTOR
SHO TAKAHAMA
BY Stanley Wolder
ATTORNEY

United States Patent Office 3,011,418
Patented Dec. 5, 1961

3,011,418
MAGAZINE FOR PHOTOGRAPHIC CAMERAS
Sho Takahama, Nishinomiya-shi, Japan, assignor to Yashica Co., Ltd., Tokyo, and Kabushiki Kaisha Konan Kamera Kenkyu-Jo, Hyogo-ken, Japan, corporations of Japan
Filed Mar. 23, 1959, Ser. No. 801,286
Claims priority, application Japan Apr. 8, 1958
8 Claims. (Cl. 95—31)

The present invention relates to a camera structure and magazine for photographic cameras, and more particularly to one which enables the close positioning of the taking lens and the view finder so as to minimize parallax errors between the two and avoid the tendency of some users, and especially those of subminiature cameras, to place their fingers over all or a portion of the picture-taking lens.

In cameras in general a stubborn problem has been the one incidental to the parallax error which causes the field of view seen within the viewer of a camera to differ from the field of the picture-taking lens, which error increases as the object to be photographed is brought closer to the camera. Obviously, then, the smaller the distance between the taking lens and the view finder lens the smaller will be the resulting parallax errors.

Ordinarily, the usual arrangement in a camera calls for the positioning of film storage and take-up reels (and chambers to house the same) at the ends of the camera, the film traveling therebetween, and a centrally positioned film frame in communication with a taking lens. However, as the case usually in a subminiature camera, it is necessary that the viewer system extend through the body of the camera and that it be positioned either to the side of the film take-up reel or the film storage reel, and in either event the chamber housing such reel lies between the viewing system and the taking lens system.

It is the primary object of the present invention to provide an arrangement of parts in a camera and magazine so as to minimize the distance between the viewer and the picture-taking lens so as to minimize parallax error, and at the same time to prevent placing the user's fingers over the taking lens.

It is a further object of the present invention to provide such a system suitable particularly for small or subminiature cameras.

The above and other objects are achieved in the preferred form of the invention hereinafter described by providing in a magazine an arrangement whereby the film storage chamber lies adjacent to the optical system for picture taking and film is caused to be transported across the film frame and then its direction reversed by sliding over an arcuate glide member towards a film take-up reel disposed between said film storage chamber and an end wall of said magazine.

FIG. 1 is a plan view partially in section of a camera and magazine embodying the present invention.

FIG. 2 is an elevational cross sectional view taken along the line I—I of FIG. 1.

Referring now to the drawing, the preferred embodiment there illustrated includes a magazine 1 removably inserted in a camera body B in which there is mounted a picture-taking lens A in optical communication, through a well bounded by recessed walls 2 of said magazine, with a film gate or frame 2' opposite which there is positioned a film pressure plate 9 resiliently mounted to a rear guide wall 4, said wall terminating on one side in a rounded glide member 3 and on the other side being curved to meet and be integral with a transverse wall 5, which, together with the front wall on opposing wall 2 of said well, provides a film storage chamber 6, and a roll of film $a$ which may be positioned therein preparatory to being transported between the pressure plate 9 and the end walls defining film frame 2'. A film take-up chamber is provided between the other side of wall 5 and the end of magazine 1 and there is positioned therein a film take-up drum 10 preferably positioned as close as possible to wall 5 so as to minimize the size of the camera structure. Said drum 10 is removably attached to a winding shaft 7 rotatably mounted to magazine 1 which in turn is pinned to a ratchet wheel 8 extending to the outside of the magazine 1 and which is adapted to be engaged by a pawl (not shown) and connected to film transport actuation means (similarly not shown but fully illustrated in my copending application Serial No. 801,-285, filed March 23, 1959, and entitled Related Film Transport Shutter Setting and Film Counter Means.

The magazine may be removably latched or locked in place in the camera body by means of the coaction of a recess 11 in said magazine, having a serrate step 11' and resiliently mounted pin 12 all as more fully described in my copending application Serial No. 801,287, filed March 23, 1959, and entitled Device for Automatically Returning a Counter and Ejecting a Magazine. The magazine may be loaded with film (in a dark room, of course) by first removing bottom cover 1' and then inserting a roll of film $a$ in film storage chamber 6, pulling the lever thereof between pressure plate 9 and the rear walls defining film gate 2' around glide member 3 and back to film take-up drum 10, securing the same to said drum.

Should the film itself be in a light-tight magazine and be provided with a leader, the loading of magazine 1 may be done without recourse to a dark room. By reason of the provision of glide member 3 the film take-up chamber housing film take-up drum 10 and its associated parts need not be positioned on the side of said wall opposite said film storage chamber but may be positioned on the same side thereof thus enabling the positioning of the taking lens and the viewing lens to be much closer. The path of the film travel then is from the film storage chamber along and in front of guide wall 4, around glide member 3 and then back of guide wall 4 to film take-up drum 10.

Details with respect to the cooperating parts of a camera, in which the embodiment of the present invention here described in detail may be employed, are contained in my copending application filed simultaneously herewith, Serial No. 801,290, entitled Shutter for Photographic Cameras, Serial No. 801,289, entitled Flash Synchronizing Device for Cameras, now Patent No. 2,960,922, and Serial No. 801,288 entitled, Device for Preventing the Overwinding of Film and the Premature Release of the Shutter in a Photographic Camera.

Although the present invention has been described with a certain degree of particularity, it is understood that the present disclosure has been made only by way of example and that numerous variations may be employed without transcending the scope of the invention as hereinafter claimed.

What is claimed is:

1. The improved combination comprising a camera including a body member having a longitudinally extending magazine receiving first well formed therein and a lens system communicating transversely with said first well from the front of said body member, and a film magazine slidably registering with and substantially housed in said first well and including a substantially light tight housing provided with a second well extending transversely from a front wall thereof and terminating at its inner end in a window defining opening facing said lens system, a pressure plate located in said housing in registry with said window and resiliently urged toward said window, a film holding chamber disposed in said housing and having a film exit opening formed therein, a film take-up member disposed in said housing, said chamber and take-up member being located on a common side of said second well, and a guide member located at the opposite side of said second well to direct film from said chamber across and in registry with said window toward said take-up member.

2. The improved combination comprising a camera including a body member having a longitudinally extending magazine receiving first well formed therein and a lens system communicating transversely with said first well, from the front of said body member, and a film magazine slidably registering with and substantially fully housed in said first well and including a substantially light tight housing provided with a second well extending transversely from a front wall thereof and terminating at its inner end in a window defining opening, a pressure plate located in said housing in registry with said window and resiliently urged toward said window, facing said lens system, a film holding chamber disposed in said housing adjacent to a first side wall of said second well, and having a film egress opening formed therein directed toward and in the plane of said window, a film take-up member located in said housing on the side of said chamber opposite said second well, and a guide member located adjacent to a wall of said second well opposite said first wall to direct film from said chamber opening across and in registry with said window toward said take-up member.

3. A film magazine in accordance with claim 2 wherein said second well and said chamber have a common dividing wall.

4. A film magazine in accordance with claim 2 including a wall disposed in said housing rearwardly of said window and extending from said chamber opening.

5. A film magazine in accordance with claim 4 wherein said guide member includes an elongated cylindrical member located at the terminus of said wall and disposed rearwardly of said window.

6. The improved combination comprising a camera including a body member having a longitudinally extending magazine receiving first well formed therein and a lens system communicating transversely with said first well from the front of said body member, and a film magazine slidably registering with and substantially fully housed in said first well and including a substantially light tight housing provided with a second well extending from a front wall thereof and terminating at its inner end in a window of rectangular outline, a pressure plate located in said housing in registry with said window and resiliently urged toward said window, a film holding chamber disposed in said housing adjacent to a first side of said second well and having a film egress opening formed therein directed toward and in the plane of said window, a partition wall extending longitudinally from said opening and rearwardly of said pressure plate, an elongated transversely extending guide member located adjacent to the free end of said partition wall and rearwardly and longitudinally spaced from the side of said window opposite said chamber, and a film take-up drum located in said housing on the side of said chamber opposite said well and having a surface thereof located rearwardly of said partition wall and in unimpeded communication with said guide member.

7. A film magazine in accordance with claim 6 including a drive member mounted on an outer face of said casing and coupled to said take-up drum.

8. A film magazine in accordance with claim 7 wherein said drive member is defined by a ratchet wheel.

References Cited in the file of this patent

UNITED STATES PATENTS

| | | |
|---|---|---|
| 1,191,632 | Whatley | July 18, 1916 |
| 1,213,694 | Schultz | Jan. 23, 1917 |
| 1,749,523 | Willson | Mar. 4, 1930 |
| 2,819,663 | Lachaize | Jan. 14, 1958 |